Figure 1:
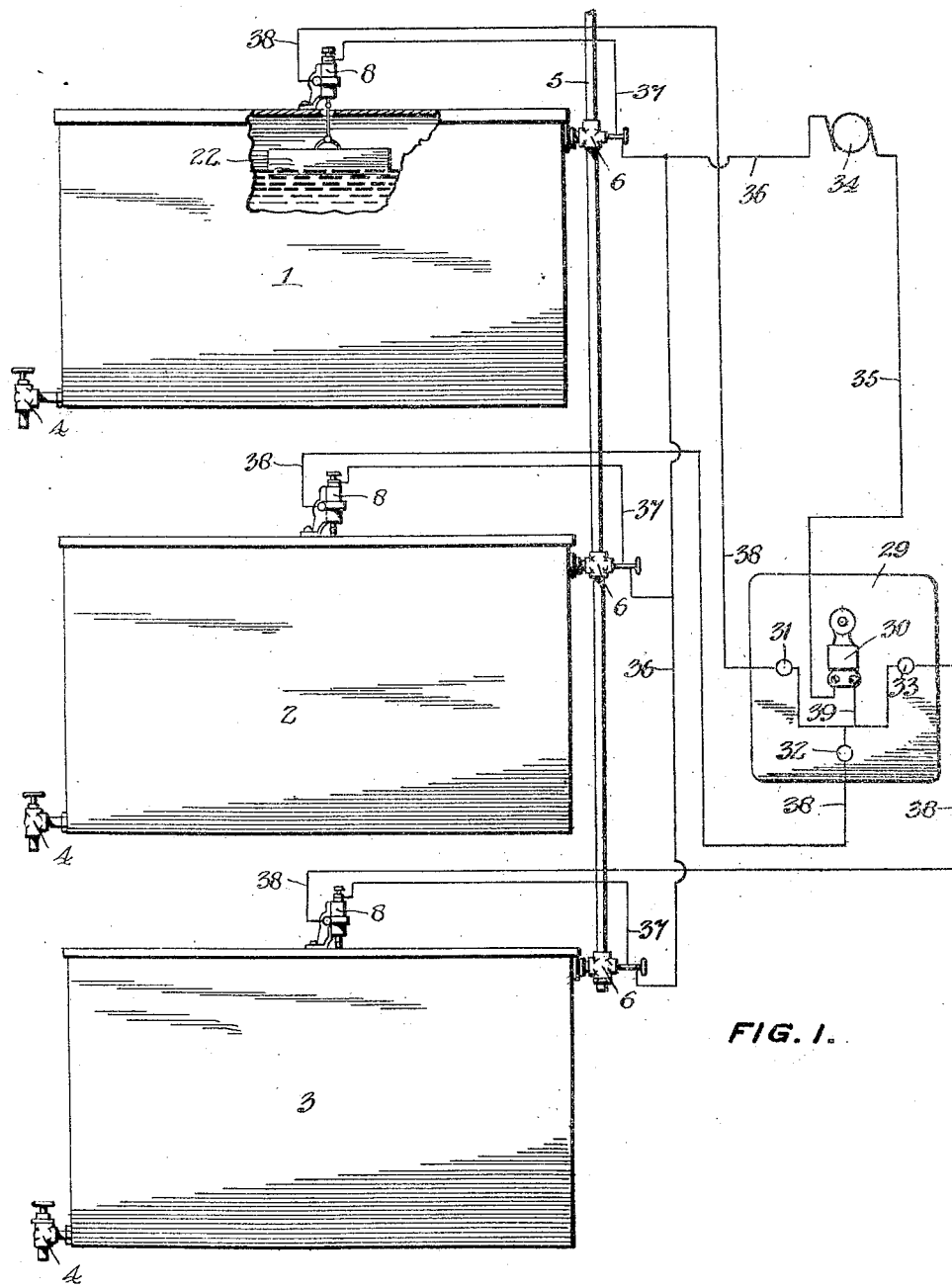

No. 894,468. PATENTED JULY 28, 1908.
J. E. SMITH.
TANK INDICATOR.
APPLICATION FILED DEC. 12, 1907.

2 SHEETS—SHEET 1.

WITNESSES
Chas. K. Davies.
Myron F. Claar

INVENTOR
J. E. Smith
By C. L. Parker
Attorney

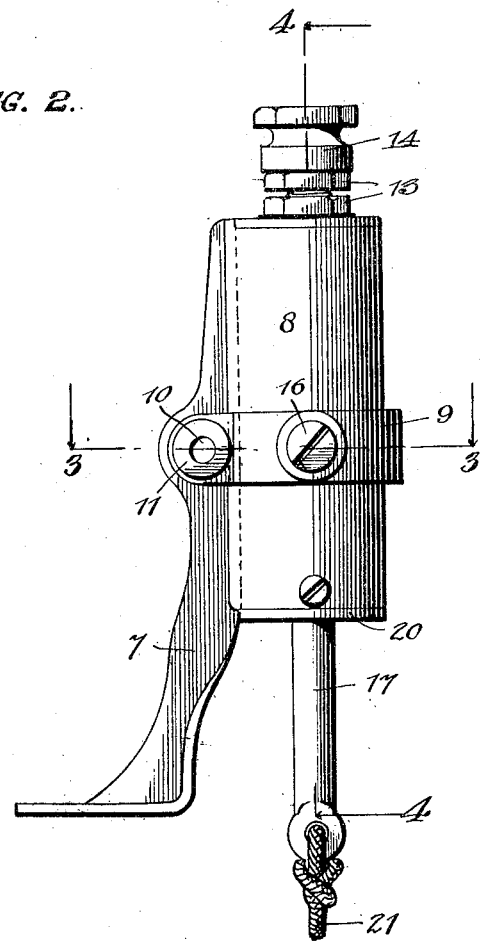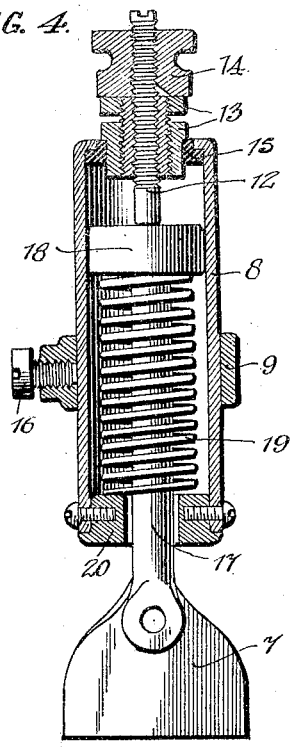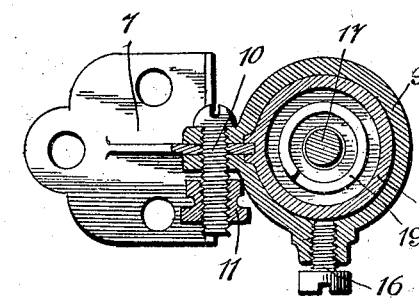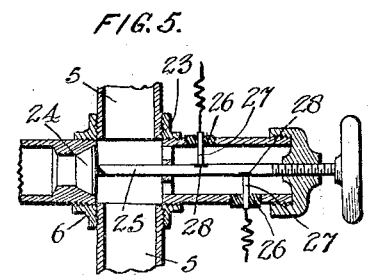

UNITED STATES PATENT OFFICE.

JULIUS E. SMITH, OF NORTH LANSING, MICHIGAN.

TANK-INDICATOR.

No. 894,468.  Specification of Letters Patent.  Patented July 28, 1908.

Application filed December 12, 1907. Serial No. 406,200.

*To all whom it may concern:*

Be it known that I, JULIUS E. SMITH, a citizen of the United States, residing at North Lansing, in the county of Ingham and State of Michigan, have invented certain new and useful Improvements in Tank-Indicators, of which the following is a specification.

My invention relates to that class of tank indicators operating to close an electrical circuit when the liquid rises above a predetermined level in order to ring a bell, and particularly contemplates the provision of a device to be used in connection with a plurality of liquid tanks, in such manner as to actuate an audible signal common to all of the tanks when the liquid rises above the predetermined level in one of the tanks and to actuate a visible signal individually to said tank.

My invention further resides in the provision of a simple and inexpensive contact mechanism carried by each of the tanks, and further in the provision of a circuit-breaking feed valve for each of said tanks.

My invention further and specifically resides in the following features of construction, arrangement and operation to be hereinafter described with reference to the accompanying drawings, forming a part of this specification, in which like numerals are used to designate like parts throughout the several figures, and in which Figure 1 is a diagrammatic view of my entire apparatus, Fig. 2 is an elevation of the tank contact-making mechanism, Fig. 3 is a cross section through said mechanism on the line 3—3 of Fig. 2, Fig. 4 is a central vertical sectional view therethrough on the line 4—4 of Fig. 2 showing the parts in contact, and Fig. 5 is a detail sectional view of the circuit-breaking valve closed.

In the practical embodiment of my invention I provide a plurality of liquid containing tanks, three of which are illustrated in Fig. 1 and numbered 1, 2, and 3, respectively, each of said tanks delivering its contents for any suitable purposes through faucets 4 and being fed from any suitable source through a pipe 5, valves 6 controlling the supply from said feed pipe 5 to each of said tanks. Mounted on each of the tanks 1, 2 and 3, respectively, is a bracket 7 to which a plunger casing 8 is secured by means of a clamping band 9 extending centrally therearound and secured to said bracket by a screw 10 having a clamping nut 11. Extending centrally downwardly within the casing 8 from its upper closed end is a threaded contact member 12 having nuts 13 to hold the same in place and having a clamping nut 14 mounted above said nuts 13, said member 12 and its nuts 13 being insulated from the casing 8 by means of an insulating ring 15. The clamping band 9 is provided with a set-screw 16 threaded therethrough and engaging said casing 8 to hold said band in its central position.

Extending upwardly within the casing 8 is a plunger comprising an elongated stem 17 having an enlarged head 18 normally forced upwardly within said casing by means of a coil spring 19 extending between said head 18 and a ring 20 secured at the lower end of said casing 8 and surrounding said stem 17. The lower end of the stem 17 is apertured to receive and hold the upper end of a connecting rod or the like 21 carrying upon its lower end a float 22 to be actuated by the liquid within the tanks, in such manner that when said liquid is below the predetermined level the stem 17 will be drawn downwardly and its head 18 will be held from contact with the member 12, while when the liquid rises above the predetermined level the float 22 will be raised, and the spring 19 will force the plunger head 18 upwardly into contact with the member 12.

After the contact has been made as described and the circuit to actuate the signals as will be hereinafter described, the valve 6 controlling the supply to the corresponding tank may be closed to break the circuit and discontinue signals until a quantity of the liquid has been drawn from said tank through its delivering faucet 4. An embodiment of valve is shown in Fig. 5 in which the same comprises a 4-way extending casing 23, two opposite ones of said extensions being designed to receive the ends of the feed pipe 5, and the other extensions being adapted to receive a valve head 24 adapted to be seated in the extension leading toward the tank and a stem 25 extending from said head outwardly through the opposite extension of said casing. The circuit is completed through wires leading to and from insulated plugs 26 on opposite sides of the outer extension of the casing 23, said wires being connected, through said plugs, to contacting points 27 extending toward and contacting with the valve stem 25 having its bearing through the outer closed end of said extension. The stem 25 provides a contacting connection between the points 27 when the valve is open, said stem being further provided with insulated portions 28 disposed in such manner as to aline with the points 27 when said stem has been rotated to firmly seat its head 24, thus breaking the circuit from its corresponding tank when the same is cut off from supply in the feed pipe 5.

The combined apparatus is illustrated in Fig. 1, an annunciator board 29 having a bell 30 common to all of the liquid tanks and having lights 31, 32, and 33 arranged thereon adjacent said bell, said lights being individually operated from the liquid tanks 1, 2, and 3 respectively. The bell 30 is in circuit with a motor 34 through its lead 35, its opposite lead 36 having branch wires 37 leading through the valves 6, as shown and described in connection with Fig. 5, to the upper end of the contact-making mechanism of each of the tanks and secured between the clamping nuts 13 and 14 of the contact member 12. Wires 38 have their ends clamped by the nuts 11 upon the casing 8, and extending from each of the tanks through their respective lights 31, 32 and 33 to a wire 39 leading to the bell 30. Thus it will be seen that when the liquid has risen above the predetermined level in any one of the tanks, a contact will be made and circuits will be completed through its corresponding light and through the bell 30 common to all of said tanks. For instance, if the liquid has risen and the contact made upon tank 1, the circuits will be completed from the motor 34, wire 35, bell 30, wire 39, light 31, wire 38, contacts 18 and 12 of the tank mechanism, wire 37 through the valve, wire 36 back to the motor, thus ringing the bell 30 and lighting light 31. The operator will then close valve 6 of tank 1, thus alining insulated portions 28 of its stem 25 with the contact points 27 of the wire 37 and breaking the circuit as previously described. If it is found necessary, or is desired, a suitable resistance may be interposed within the wire 35 leading from the motor 34 to the bell 30 to regulate the current.

Having thus fully described my invention, I claim:

1. In a device of the character described, the combination of a plurality of liquid containing tanks, valved means for feeding the liquid thereto, individual circuits leading from, and normally open at, said tanks, visible signals arranged within each of said circuits, a supplemental audible signal connected with and common to each of said circuits, means for closing said individual circuits when the liquid within their respective tanks has risen above a predetermined level, and means for automatically breaking each of said individual circuits when the said valved feeder is closed to its respective tank, substantially as described.

2. In a device of the character described, the combination of a plurality of liquid containing tanks, having valved discharge means, valved means for feeding the liquid to each of said tanks, individual circuits leading from, and normally open at, said tanks, individual visible signals arranged within each of said circuits, a supplemental audible signal in circuit with a suitable source of power, said audible signal and said source of power being connected with and common to each of said individual circuits and means within each of said individual circuits for completing the same when the liquid within its respective tank has risen above a predetermined level, and means for automatically breaking said circuit when said valved feeder has been closed, substantially as described.

3. In a device of the character described, the combination of a plurality of liquid containing tanks, valved means for feeding the liquid thereto, individual circuits leading from, and normally open at said tanks, signals arranged within each of said circuits, a supplemental signal connected within and common to each of said circuits, means for closing said individual circuits when the liquid within said tanks has risen above a predetermined level, and means for automatically breaking each of said individual circuits when the said valved feeder is closed to its respective tank, substantially as described.

4. In a device of the character described, the combination of a plurality of liquid containing tanks having valve discharge means, valve means for feeding the liquid to said tanks, individual circuits leading from and normally open at, said tanks, individual signals arranged within each of said circuits, a supplemental signal in circuit with a suitable source of power, said supplemental signal and said source of power being connected within and common to each of said individual circuits, means within each of said individual circuits for completing the same when the liquid within its respective tank has risen above a predetermined level, and means for automatically breaking said circuit when said valved feeder has been closed, substantially as described.

In testimony whereof I affix my signature in presence of two witnesses.

JULIUS E. SMITH.

Witnesses:
RALPH T. WARD,
GEO. HENNIGAR.